(12) United States Patent
Reimann et al.

(10) Patent No.: US 12,706,456 B2
(45) Date of Patent: Aug. 11, 2026

(54) DC GRID

(71) Applicant: Siemens Energy Global GmbH & Co. KG, Munich (DE)

(72) Inventors: Oliver Reimann, Erlangen (DE); Wolfgang Voss, Oberreichenbach (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 869 days.

(21) Appl. No.: 17/926,498

(22) PCT Filed: May 26, 2021

(86) PCT No.: PCT/EP2021/064078
§ 371 (c)(1),
(2) Date: Nov. 18, 2022

(87) PCT Pub. No.: WO2021/239826
PCT Pub. Date: Dec. 2, 2021

(65) Prior Publication Data

US 2023/0187930 A1 Jun. 15, 2023

(30) Foreign Application Priority Data

May 26, 2020 (GB) ..................................... 2007819

(51) Int. Cl.
*H02J 1/102* (2026.01)
*H02J 1/08* (2026.01)
*H02J 105/30* (2026.01)

(52) U.S. Cl.
CPC .............. *H02J 1/102* (2013.01); *H02J 1/084* (2020.01); *H02J 2105/31* (2026.01)

(58) Field of Classification Search
CPC ........ H02J 1/102; H02J 1/084; H02J 2310/42; H02J 1/08

(Continued)

(56) References Cited

U.S. PATENT DOCUMENTS

2010/0133901 A1* 6/2010 Zhang .................. H02M 5/458 363/35
2012/0299376 A1* 11/2012 Schaefer .................. F03D 9/25 320/101

(Continued)

FOREIGN PATENT DOCUMENTS

DE 102018216785 A1 4/2020
EP 3109964 A1 12/2016
EP 3393029 A1 10/2018

OTHER PUBLICATIONS

PCT International Search Report and Written Opinion of International Searching Authority mailed Dec. 2, 2021 corresponding to PCT International Application No. PCT/EP2021/064078 filed May 26, 2021.

(Continued)

*Primary Examiner* — Rexford N Barnie
*Assistant Examiner* — Joshua James Sweet
(74) *Attorney, Agent, or Firm* — Wolter Van Dyke Davis, PLLC

(57) ABSTRACT

A power generation grid for a vessel, rig or platform includes a primary energy source located above the waterline and a plurality of DC sub-assemblies, located below the waterline. Each DC sub-assembly has a DC bus, a DC/DC converter adapted to couple the DC bus to a DC energy source; an AC/DC converter adapted to couple the DC bus to an AC energy source; a DC/AC converter adapted to couple the DC bus to a corresponding load, and a first switch adapted to couple the DC bus to a DC bus of another DC sub-assembly.

23 Claims, 13 Drawing Sheets

(58) Field of Classification Search
USPC ........................................................ 307/43
See application file for complete search history.

(56) References Cited

U.S. PATENT DOCUMENTS

| | | | | |
|---|---|---|---|---|
| 2016/0031391 | A1 | 2/2016 | Dong | |
| 2018/0034280 | A1 * | 2/2018 | Pedersen | E21B 41/00 |
| 2018/0159315 | A1 * | 6/2018 | Aagesen | H02H 7/268 |
| 2019/0036336 | A1 * | 1/2019 | Kuznetsov | H02K 7/025 |
| 2020/0189404 | A1 * | 6/2020 | Haugan | B60L 53/22 |
| 2022/0355944 | A1 * | 11/2022 | Biaujaud | H02J 1/108 |
| 2023/0369965 | A1 * | 11/2023 | Braginsky | H02M 7/44 |

OTHER PUBLICATIONS

Rodrigues, Rostan et al: “Solid state circuit breakers for shipboard distribution systems”; 2017 IEEE Electric Ship Technologies Symposium (ESTS), IEEE; Aug. 14, 2017 (Aug. 14, 2017), pp. 406-413; XP033227788.

* cited by examiner 1
25
3
3
11
20
12
14
14
26
26
26
7
7
7
7
8
15
27
30
30
30
30
30
9
17
17
17
5
31
Z1
Z2
Z3
Z4
Z5
Z6
Z7
Z8
G
M 1
25
3
11
12
20
14
26
7
8
G
15
27
33
34
39
37
32
9a
9b
17
36
21
35
M
Z1
Z2
Z3
Z4
Z5
Z6
Z7
Z8

1
25
26
14
15
39
34
33
32
17
9a
9b
9c
21
23
40
41
42
7
8
20
12
11
3
G
M 50
1
25
30
3
14
14
14
8
23
17
7
21
9
10
G
M 51
54
53
58
57
60
11
3
61
12
56
55
20
59
G
M 1
3
11
12
13
14
15
20
25
26
73
74
75
9a
9b
G
M 1
15
25
80
81
82
83
84
9
Z1
Z2
Z3
G
M 94
95
90
G
M
93c
91
93b
96
97
98
92
93a

DC GRID

CROSS REFERENCE TO RELATED APPLICATIONS

This application is the US National Stage of International Application No. PCT/EP2021/064078 filed 26 May 2021, and claims the benefit thereof. The International Application claims the benefit of United Kingdom Application No. GB 2007819.2 filed 26 May 2020. All of the applications are incorporated by reference herein in their entirety.

FIELD OF INVENTION

This invention relates to a DC grid, in particular for a marine, or seagoing, vessel, platform, or rig.

BACKGROUND OF INVENTION

For large ships and drilling platforms, diesel-electric propulsion is becoming increasingly popular. The mechanical energy of the diesel or gas turbines is first converted into electrical energy with the help of a generator and then converted back into mechanical energy in the vicinity of the drive (e.g., propeller) with a converter and an electric motor. Improved DC grids are desirable.

SUMMARY OF INVENTION

In accordance with a first aspect of the present invention a power generation grid for a vessel, rig or platform comprises a primary energy source located above the waterline and a plurality of DC sub-assemblies, located below the waterline; wherein each DC sub-assembly comprises a DC bus, a DC/DC converter adapted to couple the DC bus to a DC energy source; an AC/DC converter adapted to couple the DC bus to an AC energy source; a DC/AC converter adapted to couple the DC bus to a corresponding load, and a first switch adapted to couple the DC bus to a DC bus of another DC sub-assembly This design addresses the need to improve safety and efficiency of DC grid connection for vessels, platforms and rigs. Generation of circular currents caused by asymmetrical resistance splitting due to the conventional ring-shaped structure for the AC generators is avoided and valuable space above the waterline is freed up, by using direct connections of the AC generators, rather than a ring.

The first switch may be adapted to couple the DC bus in parallel to a DC bus of each of the others of the plurality of DC sub-assemblies.

Each DC sub-assembly may further comprise a second switch adapted to couple the DC bus to a DC bus of one other of the plurality of DC sub-assemblies.

The DC sub-assembly further comprises a third switch, adapted to be coupled to a DC bus of another of the plurality of DC sub-assemblies.

In this way, a ring on the DC bus may be provided, to share power from the star connected generators.

Each DC sub-assembly may be adapted to be installed in a watertight housing below the waterline of a rig or platform having topside elements and elements below the waterline.

On a rig or platform, watertight pontoons below the waterline are provided and using these leaves more space topside for other equipment.

A plurality of DC sub-assemblies may be mounted in the same watertight housing.

At least one of the DC sub-assemblies may further comprise an AC/DC converter adapted to couple an AC generator to the DC bus.

The primary energy source may comprise a plurality of AC generators, or a plurality of DC generators, or a combination thereof.

The DC energy source may comprise a plurality of DC energy storage units.

The provision of batteries, or other energy storage, within the DC grid allows utilization to be further optimized. With a suitable arrangement, the energy storage may be used to ensure that a generator starts up promptly in the event of failure of the operating generator, in particular, if the DC grid system is running with only a single generator.

In one embodiment, the energy storage is provided locally for each DC sub-assembly, in particular for an LV DC system the energy system may comprise a plurality of energy storage modules each connected to a different DC bus.

The DC energy storage may be connected directly to the DC bus of the DC sub-assembly, below the waterline, Alternatively, above the waterline each DC energy storage unit may be coupled via a bus section of a DC ring to the DC bus of the DC sub-assembly; and wherein the bus section of the DC ring is coupled at each end, via switches in the DC ring, to another bus section of the DC ring.

A ring configuration for DC energy storage units, above the waterline, provides a supply of power on demand to any load, even if the generator associated with that load is not yet operational, but the star format for connecting the generators to the DC sub-assemblies is best because fewer switches are required to supply from the primary energy source, so the loads coupled to the DC sub-assemblies are supplied with the reduced losses, compared to a generator ring and the energy storage allows time for the generators to be started up, if need be, so fuel is only used by the generators when there is a load demand, making the operation more environmentally friendly.

The energy storage unit may comprise a plurality of energy storage modules each energy storage unit being coupled to a different section of the DC ring.

This enables energy to be shared more easily, for example if one DC sub-assembly has a higher power demand than another. This is particularly suitable for an MV DC system.

The sections of the DC ring may be separated by switches.

The number of sections may be greater than the number of energy storage modules connected to a section.

The switches may comprise solid state breakers, in particular, one of a semiconductor switch, or intelligent load controller.

The AC generators may be coupled to at least one DC sub-assembly.

At least one of the AC generators may be coupled to at least two DC sub-assemblies.

The AC generator may comprise a two-winding system with two rectifiers, one rectifier for each DC sub-assembly.

Larger generators may be chosen to be capable of feeding two zones of the vessel or rig or platform and have a two-winding system with two rectifiers, one for each system. Each of these rectifiers may be connected to one of the zones.

The two rectifiers may be connected in parallel to an output of the generator.

The generator may comprise a variable frequency generator.

Operating the generator as a variable frequency generator helps to reduce fuel consumption.

The DC grid may operate at up to 1500 V DC, in particular between 1000V to 1500V DC.

The grid may be operated as a low voltage (LV) grid.

Alternatively, the grid may be operated as a medium voltage (MV) grid wherein the DC grid operates at up to 35000 V DC, in particular between 6000V DC and 18000V DC, or between 6000V DC and 35000V DC.

BRIEF DESCRIPTION OF THE DRAWINGS

An example of a DC grid in accordance with the present invention will now be described with reference to the accompanying drawings in which.

DETAILED DESCRIPTION OF INVENTION

Figure 1:
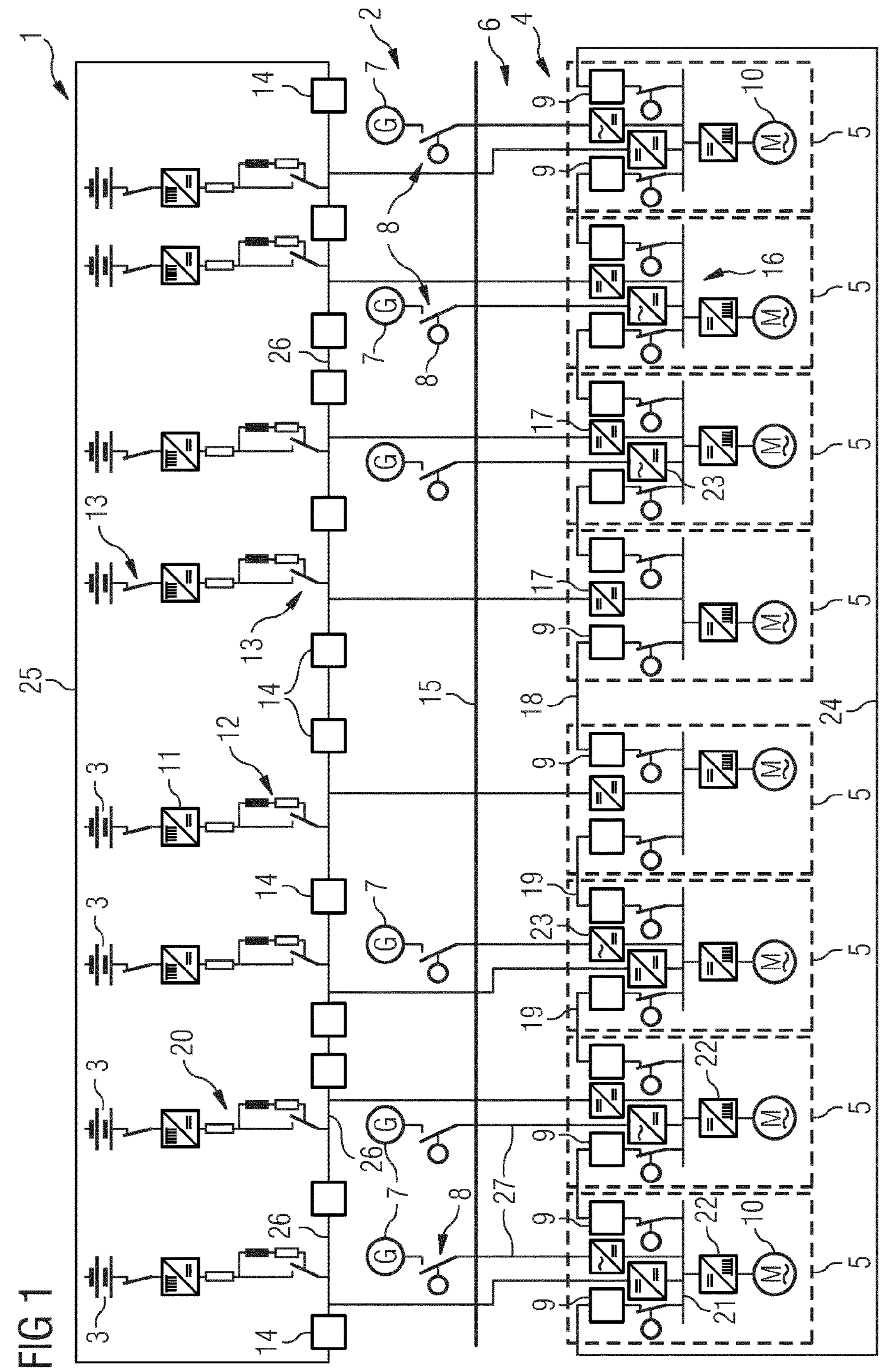
FIG. 1 shows a ring configuration for a drilling rig.

The present invention addresses the need to improve safety and efficiency of DC grid connection for vessels, platforms and rigs.

In alternating current (AC) systems, to achieve the highest possible reliability of the entire AC distribution system, a ring configuration is often used for electrical energy distribution. Several diesel generators and drive converters are connected with a cable ring or bus bar ring. This ring is designed to be separable at many points with AC switches, or bus couplers.

Low voltage direct current (LV-DC) grid solutions are already established in the market for power flow between connected sources and consumers. For higher availability, there are LV-DC grid solutions designed in a closed ring configuration. Typically, within this ring configurations fast solid-state circuit breakers (SSCB) are used instead of the AC bus couplers mentioned in the AC ring configuration.

For rigs, or platforms, conventionally only AC grids have been used. For higher availability, the AC grids are connected in a closed ring configuration. For this application, the AC ring installations are medium voltage (MV) AC solutions. If it is possible to prove that the bus tie coupler and the protection scheme can ensure a safe disconnection between two zones in case of failure, then the systems are permitted to operate in a closed bus tie.

Generators and the MV switchgear, as well as LV DC multidrive systems for drilling are all installed topside. Typically, AC drives with transformers are installed within the pontoons below the water line to minimize the equipment topside, where space is at a premium.

As electrical grids move more and more from the AC-grid solution into a DC-grid solution for the power flow between different sources and consumers, drive technologies will move from LV-DC solutions (typically up to 1500 V DC, more typically, 1000V to 1500V DC) towards MV-DC solutions (more typically DC 6000V and further up to 18000V, or even up to 35000V DC). This range was previously a common DC voltage used in drives that are currently operating with 4.16 kV AC. For higher availability, the power distribution for the sources and consumers needs to be via a ring configuration. Some MV DC solutions have been proposed for commercial or navy vessels. In these types of DC solution, the MV AC switches may be replaced by fast MV DC switches, typically solid-state breakers, such as semiconductor switches, or intelligent load controllers.

By installing an MV DC grid it is also possible to provide an LV DC grid for the smaller power consumers, for example with a connection via an MV DC to LV DC converter that is based on a dual active bridge and a high frequency transformer.

Following the conventional AC setup approach, in a DC solution, power distribution and grid solutions would also be installed topside, with motors in the pontoons. However, this can give rise to certain problems in a DC system, for vessels and rigs, whether MV DC or LV DC. A first problem is that circular currents are generated, caused by asymmetrical resistance splitting due to the ring-shaped structure. These circular currents change the desired load flow and cause additional losses as well as higher design requirements on the no-load disconnector. The protection strategy would need modification to detect and handle these ring currents. A further problem is that when there is only a partial load requirement, then several diesel engines are switched off and there may be a long period of operation, during which the ship, rig, or platform is operated with only one or a limited number of diesel generators feeding all zones. This was not an issue for an AC system, but with DC, using solid state switches, or ILCs, the energy needs to be conducted through many switches or ILCs in the ring configuration. In each of the switches or ILCs, there are losses which leads to poor efficiency of the energy distribution system overall. Furthermore, for rigs or platforms, the installation in the conventional way is topside, taking up valuable space which the operator would prefer to keep for other purposes. As described in EP3109964, incorporated herein by reference, a ring configuration connection may be used to further increase availability.

Thus, the present invention uses an alternative configuration, in place of the ring configuration of the power connection of the individual zones. This alternative configuration is based on a STAR connection and referred to hereinafter as an ECO STAR connection. This provides a far more efficient energy distribution system which is able to take account of the need for operating setups where lower generator availability is required. A power generation grid for a vessel, rig or platform comprises a primary energy source located above the waterline and a plurality of DC sub-assemblies, located below the waterline. Each of the DC sub-assemblies comprise a DC bus, a DC/DC converter adapted to couple the DC bus to a DC energy source; an AC/DC converter adapted to couple the DC bus to an AC energy source; a DC/AC converter adapted to couple the DC bus to a corresponding load, and a first switch adapted to couple the DC bus to a DC bus of another DC sub-assembly. The configuration reduces the total number of solid-state breakers that are needed to transfer energy from a source to the multiple sinks, as compared to a ring configuration. This is beneficial because each solid state breaker has a forward voltage of about 10V to 30V, so the effect of a number of such breakers in series for power transport is significant.

Generator operation may be optimised using fewer generators than the number of thruster or propulsion loads being served. This may lead to a combination of larger and smaller generators being used to get more flexible operation with a relatively low number of generators in operation, each of which has a relatively high load. Larger generators may be chosen to be capable of feeding two zones of the vessel or rig or platform and have a two-winding system with two rectifiers, one for each system. Each of these rectifiers may be connected to one of the zones. In one embodiment, the two rectifiers may be connected in parallel to the generator output. In some embodiments, a combination of large and small generators may be used.

The provision of batteries, or other energy storage, within the DC grid solution allows utilization to be further optimized. With a suitable arrangement, the energy storage may be used to ensure that a generator starts up promptly in the event of failure of the operating generator, in particular, if the DC grid system is running with only a single generator. In a DC setup the generator may be operated as a variable frequency generator to reduce fuel consumption. Typically, the energy storage is installed at the LV DV grid and energy of the battery is able to flow in both directions via the MV/DC converter. However, there may be circumstances in which the energy storage is charged from either grid, but discharged only to the grid to which it is directly connected, or charged only from the grid to which it is directly connected, but discharged to either grid. The LV DC grid may comprise a ring configuration of bus sections coupled together with breakers, with each of a plurality of energy storage units coupled to a DC bus section. A connection is then provided from the DC bus section to a DC subassembly.

The star setup chosen depends upon the configuration or operational requirements. The main use of a star connection is to get improved efficiency and to reduce SSCB losses within the total system. The SAFE STAR connection ensures the highest availability, where there is only a loss of one generator or thruster in the case of a fault, as well as providing the highest efficiency for the DC grid power distribution for the lowest number of engines operating.

FIG. 1 shows an example of a ring configuration on an MV DC system for a drilling rig having MV and LV parts. The arrangement comprises a topside part 2, i.e., above the waterline 15, in which power sources 3 comprising energy storage, such as batteries, are arranged in an LVDC ring configuration 1 and a separate MV DC ring configuration 4 is arranged within pontoons 5 of the drilling rig, located below the waterline, in an underwater part 6. The LVDC ring is formed by a bus 25 between LV fast breakers 14 at each end of a series of LV buses 26 connecting each of the energy storage units 3 to a neighbouring energy storage unit. The energy storage capacity for the LVDC ring 1 is chosen according to the requirement. Each energy storage typically may have a capacity of up to 1000 kWh, with multiple energy storage units used to achieve the desired total capacity. In the example shown, there are eight battery packs, but there may be more or fewer on the ring, as needed. Each of the energy storage units 3 is coupled to the LVDC ring 1 via a DC chopper 11 and a fuse 20. The DC chopper comprises a capacitor bank, which needs to be pre-charged on start-up, so a pre-charge circuit 12 comprising a resistor in series with a small fuse is able to be switched in and out of the line to the LVDC buses 26 by mechanical switch 13. In normal operation, the DC chopper and its fuse are directly connected to the LVDC bus, but for start up, they must be connected through the pre-charge circuit 12.

The advantage of installation of the MV DC ring within the pillows of the pontoon is that more space is freed up topside. Topside there are only MV generators 7 with MV disconnection breakers 8 installed and the LV DC grid. The LVDC distribution is installed as an extension of the drilling multidrive setup in this arrangement, the LVDC grid 1 is formed by adding further fast LV breakers 14, such as solid-state circuit breakers (SSCBs) and the sources 3, for example, energy storage, such as batteries, or further loads (not shown), for example, a ship net supply for the hotel loads. Only the SSCBs 14 and the energy storage units 3 are shown in this figure. The fast breakers are connected to the MVDC bus via motor controlled switches to provide galvanic isolation. These may have a rated current of 2 kA The main equipment, i.e., the individual MVDC grids 16 within each zone, are placed below the waterline 15 within the pontoons 5, to release space topside. The LVDC grid 1 is connected via DC/DC converters 17 with the MVDC grid 4.

The MVDC grids 16 typically comprise a DC bus 21 coupled to the DC/DC converter 17 through a fuse, fast breakers 9 at each end of the DC bus 21, with galvanic isolation and a DC/AC converter 22 connected through a fuse to a load 10, such as thruster, in this example a 4.5 MW thruster. In some of the grids, the DC bus is also coupled to a generator 7 through an AC/DC converter, or rectifier 23. The generator may be connected to the converter via a motor-controlled switch 8 and bus 27. The generators typically produce between 5 MW and 10 MW and may be combined to produce the required power. In this example, the supply to zones Z1, Z2, Z7, Z8 is 5.2 MW at 4.4 kV, with a power factor of 0.94 from a variable speed generator and the supply to zones Z3 and Z6 is 10 MW at 4.4 kV with a power factor of 0.94 from a variable speed generator. The DC grid may operate at up to 35000 V DC. Typically, the MVDC grid operates between 6000V DC and 18000V DC. The supply to zones Z4 and Z5 is only from the LVDC ring 1. The grids 16 of zones Z1 to Z4 are connected to the grids 16 of zones Z5 to Z8 by a cable 18 with fast breakers 9 at each end and each grid 16 within the groups of grids Z1 to Z4, Z5 to Z8 is connected to its neighbour by a bus duct 19 and fast breakers 9, such as SSCBs, or motor-controlled switches and ILCs. The bus duct is more rigid than cables, which can be useful for passing through bulkheads, or fixing to a wall. The grids of zones Z1 and Z8 are coupled together by bus 24. However, with the example shown, the ring configuration 4 requires sixteen SSCBs 9 and each of these contributes to losses in the system, the more so if only one or two of the possible generators 7 are operational, since the power that they produce must be carried around the ring to feed loads on other buses which do not have an operational generator.

Figure 2:
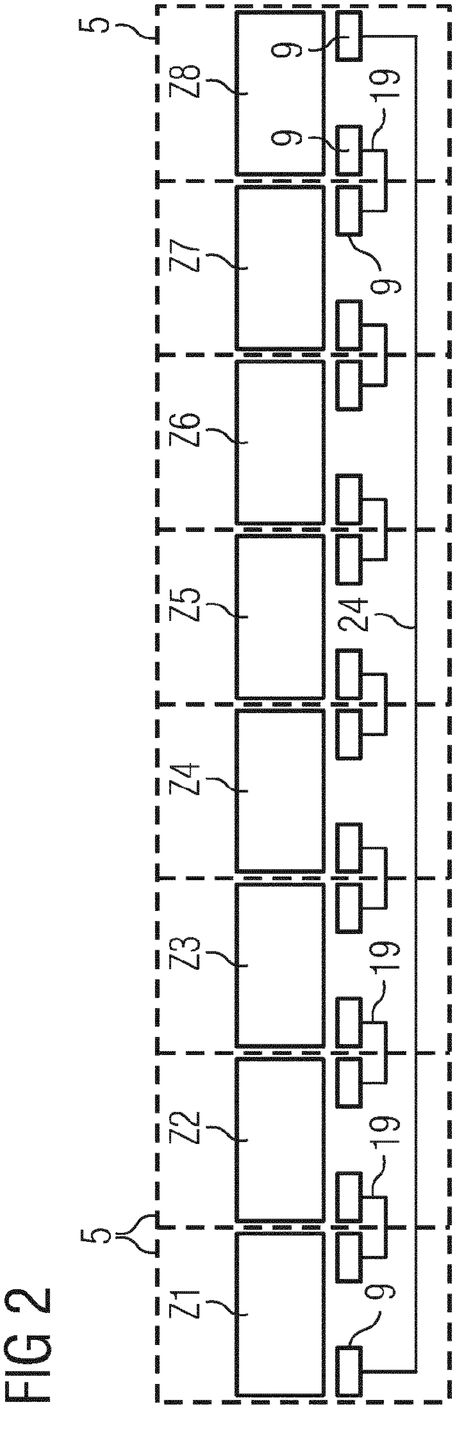
FIG. 2 shows a ring configuration.

FIG. 2 shows an alternative view of the ring configuration of FIG. 1 and the principal connection of the zones, with SSCBs providing a ring connection between 8 zones in this example. However, the total number of SSCBs may vary depending on the vessel or rig in which it is installed.

Figure 3:
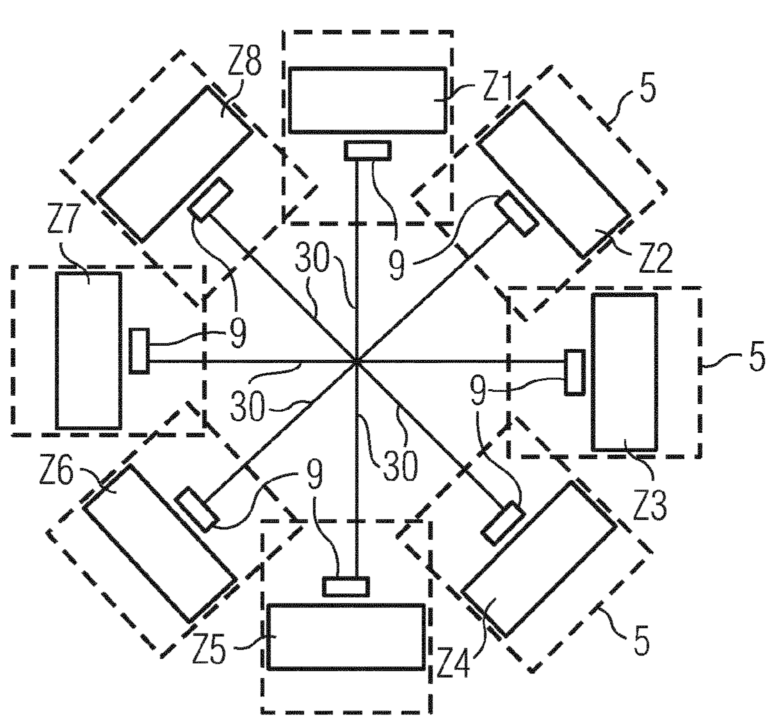
FIG. 3 shows one embodiment of a DC grid configuration.

FIG. 3 shows illustrates a first configuration according to the present invention, referred to as ECO STAR and the principal connection of the zones with 8 SSCBs. Zones Z1 to Z8 are all connected via fast breakers 9 in the underwater sections 6 and buses 30 between the sections. The configuration shows connections that give an optimized efficiency when partially loaded and with only one generator connected. This is sufficient for standard availability requirements.

Figure 4:
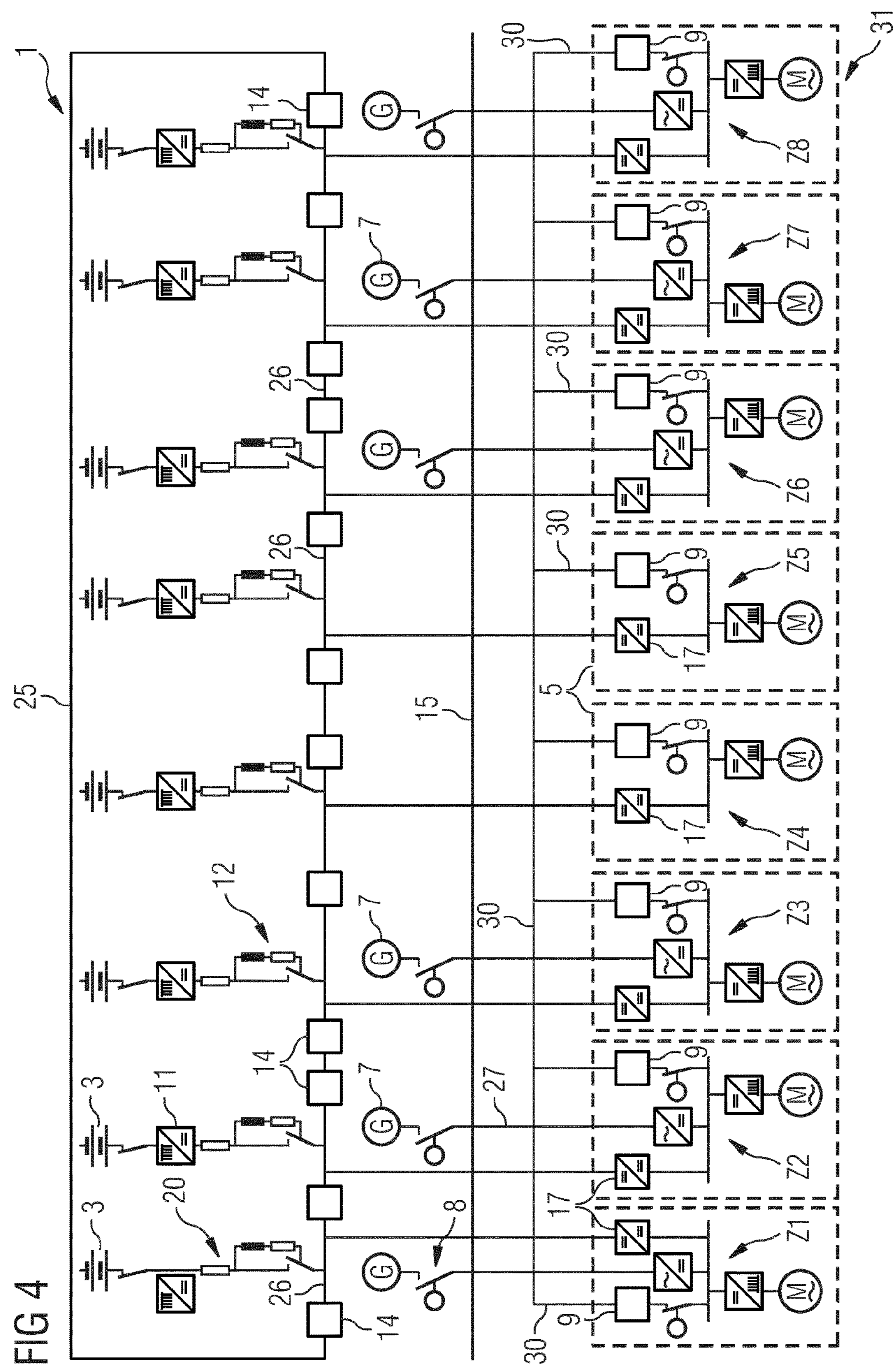
FIG. 4 shows another embodiment of a DC grid configuration.

FIG. 4 shows the configuration of FIG. 3 for an example of a drilling rig with the advantage of installation of the distribution grid within the pillows of the pontoon, using eight SSCBs. The LVDC ring 1 follows the same structure as in FIG. 1 and like references are used for like components, so this will not be repeated here. In this example, the configuration of the present invention is on the MVDC 31. The main equipment, the individual MVDC grids within each zone, Z1 to Z8, are placed below the waterline 15 within the pontoons 5. The LVDC grid 1 is connected via a DC/DC converter 17 with the MVDC grid 31. On the LVDC grid 1 only the batteries are shown, but there may be further sources and loads.

Figure 5:
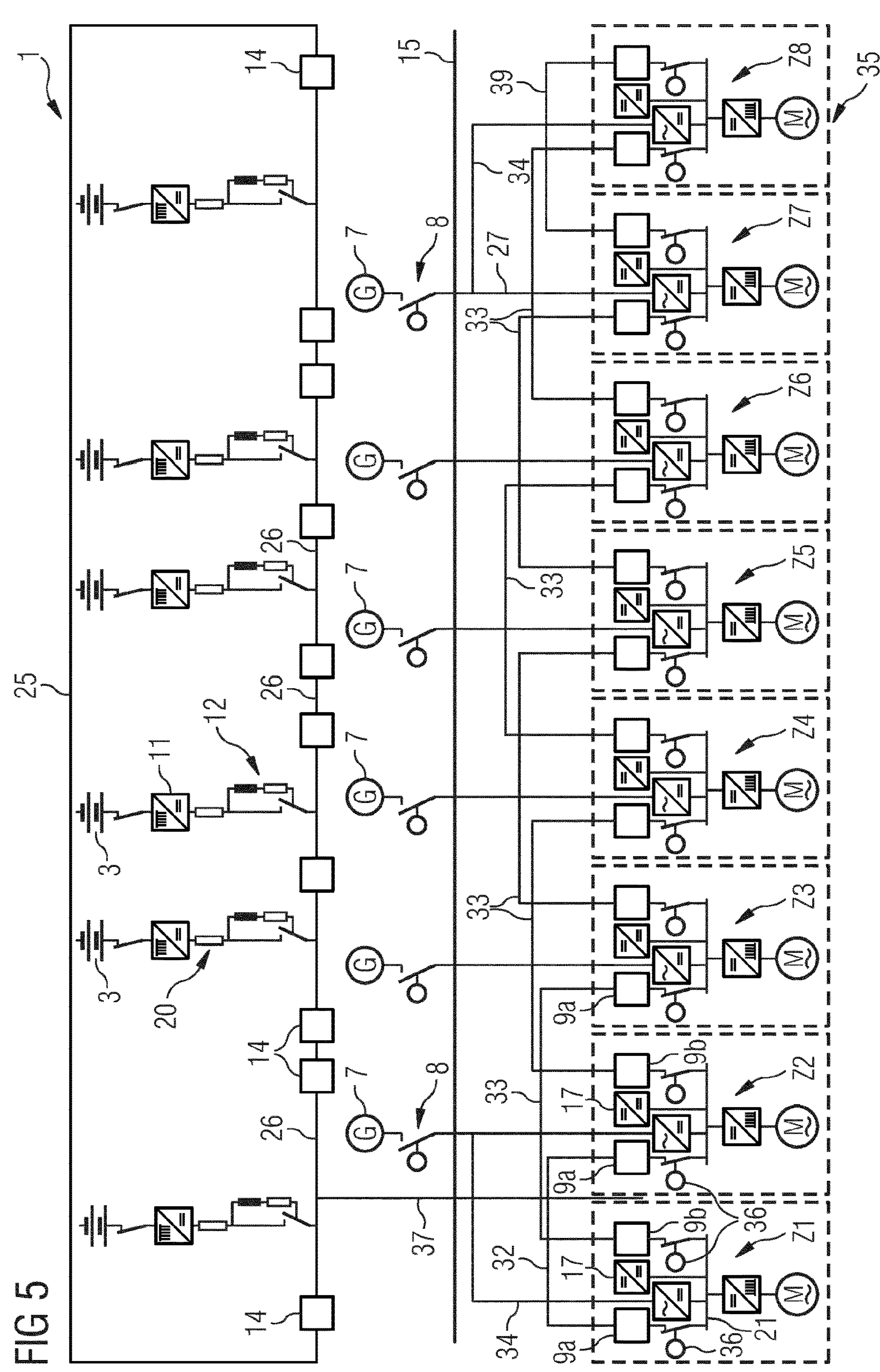
FIG. 5 shows an alternative configuration with enhanced availability.

FIG. 5 shows another configuration according to the present invention, optimised for availability for a drilling rig with the advantage of being located within the pillows of the pontoon 5, using 16 SSCBs. The same references are used when referring to components already introduced in earlier examples. The configuration is optimized for availability on the MVDC grid 35. The main equipment, the individual MVDC grids within each zone, Z1 to Z8, are placed under the waterline 15 within the pontoons 5. Zones Z1 and Z2 share an additional supply from generator 7, as do Z7 and Z8, whereas Z3, Z4, Z5 and Z6 all have independent generators 7. The grids within each zone comprise an MV fast breaker 9*a*, at a first end of the bus and MV fast breaker 9*b*, at a second end of the bus, for example an MV ILC. The breakers 9*a*, 9*b* are connected to the bus 21 in these examples by motor-controlled switches 36 for galvanic isolation. The grid of the first two zones Z1 and Z2 are connected between the breakers 9*a* at their first ends, via a bus 32. The grid of Z1 is connected at the other end to the grid of Z3 via breakers 9*a*, 9*b* respectively and bus 33. In this arrangement, the grids in the final two zones, Z7 and Z8 connect via ILCs 9*b*, with all the intervening grids in zones Z3 to Z6 connecting the first ILC 9*a* of one to the second ILC 9*b* of another zone grid. The LVDC grid 1 is connected via a bus 37 and a DC/DC converter 17 with the MVDC grid 35. The detail is omitted for clarity. On the LVDC grid only energy storage in the form of batteries is shown, in this example, only six energy storage units, although there may be further power sources and loads.

Figure 6:
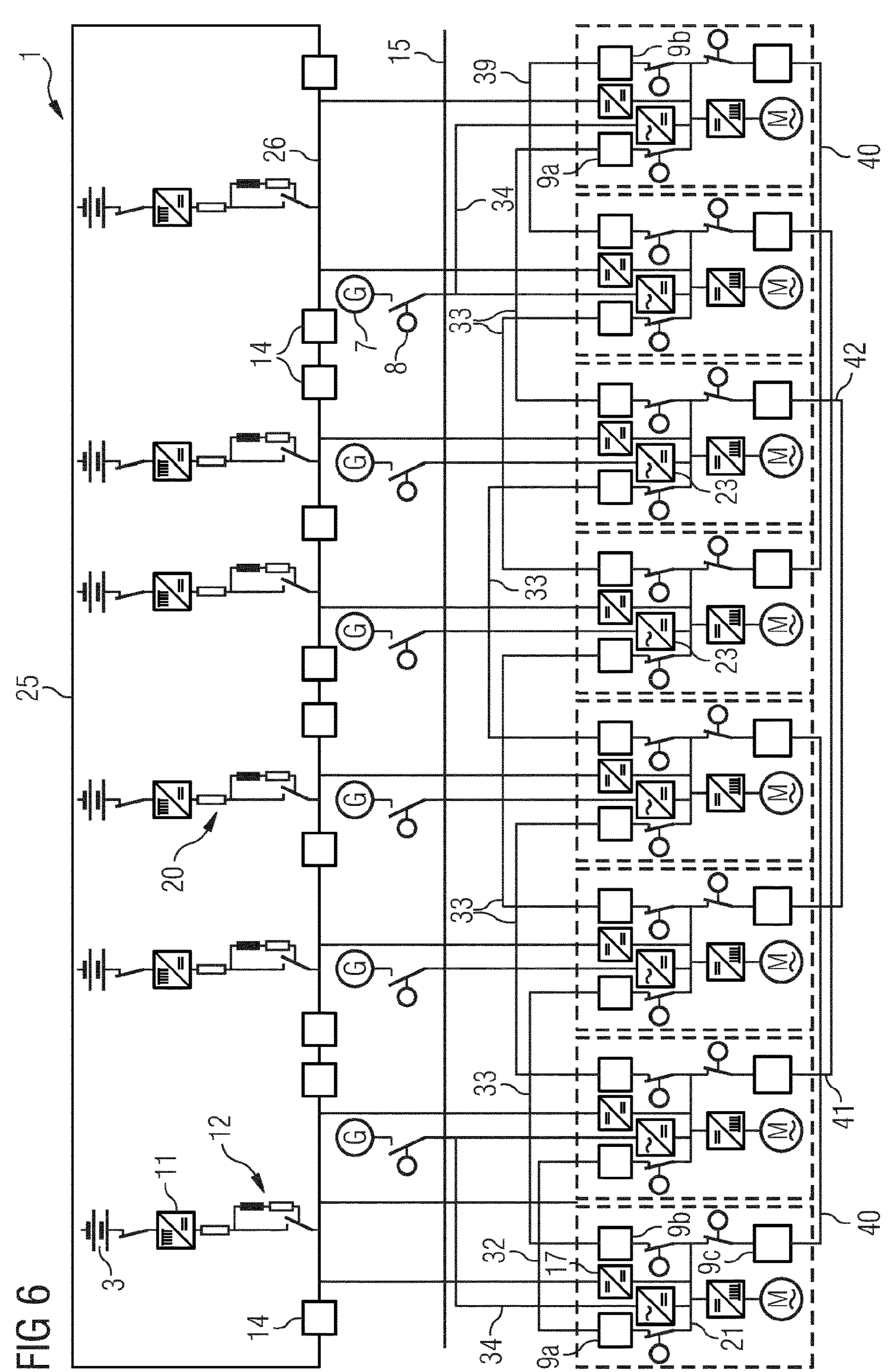
FIG. 6 shows a configuration with enhanced availability.

FIG. 6 shows another optimised configuration, optimised for availability & efficiency for a drilling rig with the advantage of the grid installation being within the pillows of the pontoon. This example uses 16 SSCBs. The configuration is optimized for availability & efficiency on the MVDC. The main equipment, the individual MVDC grids within each zone, are placed below the waterline within the pontoons. The LVDC grid is connected via a DC/DC converter with the MVDC grid. On the LVDC grid only the batteries are shown, although there may be further energy sources and loads on the LVDC grid. The LVDC grid is connected to the grids of each zone Z1 to Z8 in the same way as for the earlier embodiments, i.e., through a DC/DC converter to each zone bus 21. As in FIG. 5, supply from six energy storage units is shown.

The MVDC grid has the same connection arrangements 32, 33 as in FIG. 5 between buses via the fast breakers 9*a*, 9*b* at the first end of the bus and at the second end of the bus. In addition to these, a further fast breaker 9*c* is provided at the second end of each bus and used to couple each bus to a bus in a different zone, to which it is not already connected by fast breakers 9*a*, 9*b*. For example, Z1 connects to Z2 via breaker 9*a*, to Z3 via breaker 9*b* and to Z4 via breaker 9*c* through bus 40. Similarly, for Z8, connecting to Z5 via breakers 9*c* and bus 40. Z2 connects to Z7 through breakers 9*c* and bus 41 and Z3 connects to Z6 through breakers 9*c* and bus 42.

Figure 7A:
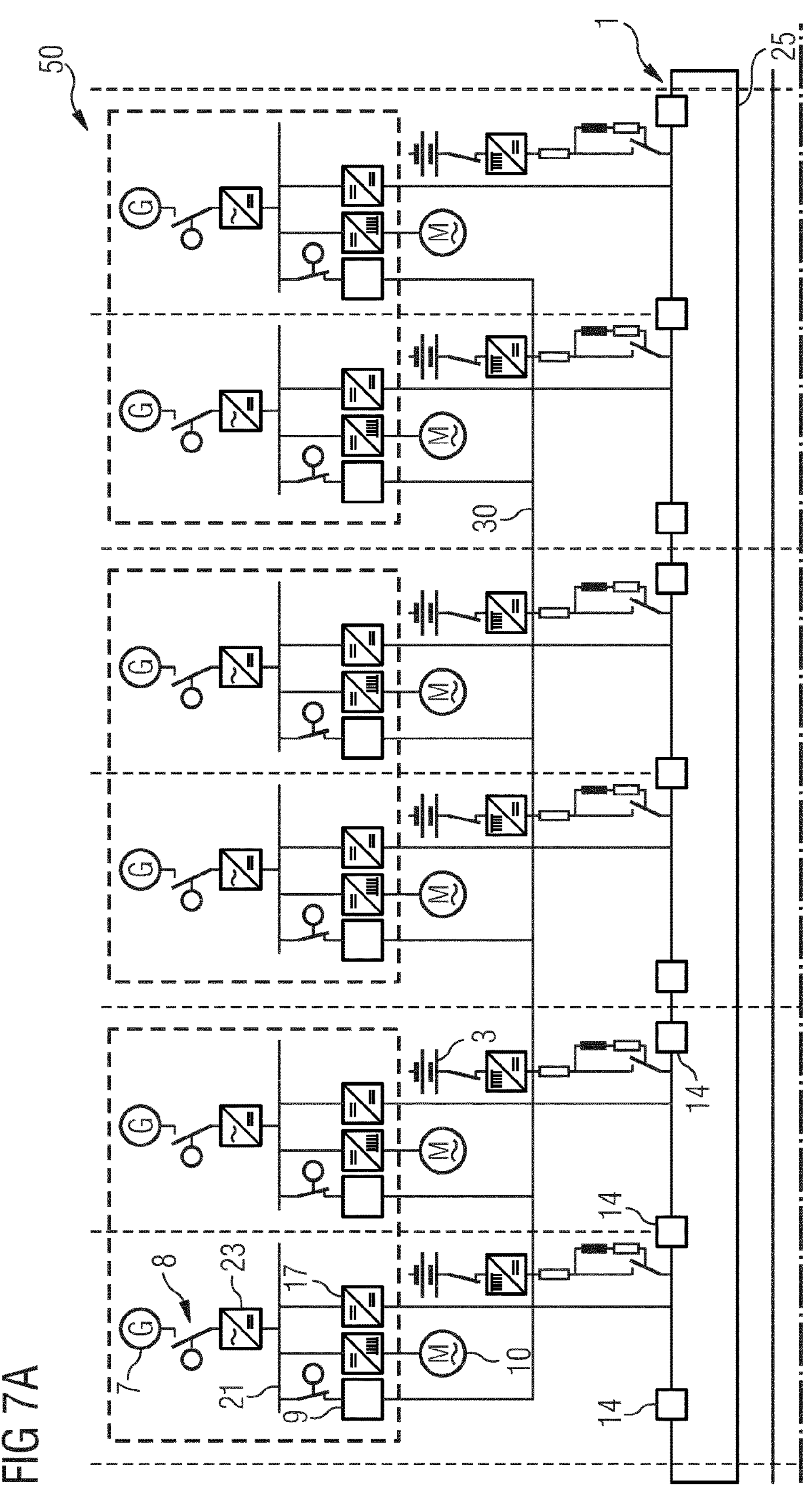
FIG. 7 shows an embodiment of a configuration for vessels or rigs for MVDC or LVDC.
Figure 7B:
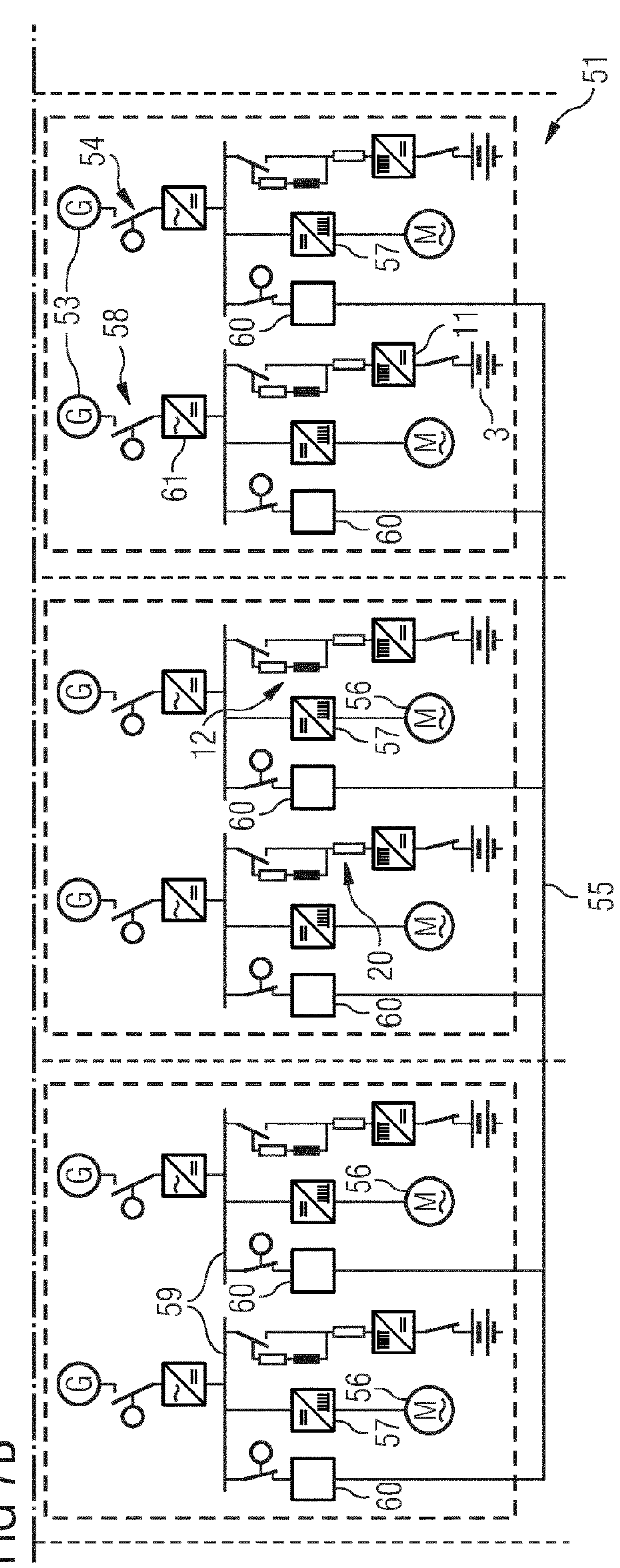

FIG. 7 shows another configuration example for vessels or rigs for MVDC 50, or LVDC 51 having 8 SSCBs. The two optimized configurations shown in FIGS. 5 and 6 may be implemented in the same way. FIG. 7 shows the general arrangement for 3 zones by using a star configuration on the MVDC and on the LVDC. As before, for the MVDC solution 50 there may also be an LVDC grid 1. The LVDC grid 1 is connected via a DC/DC converter 17 with the MVDC grid 21 and each grid in each zone is connected to the other grids in other zones by bus 30. On the LVDC grid 51, the buses 59 of each grid in the zones are connected to each other by bus 55 through fast breakers 60 with motor controlled switches. Energy storage, in the form of batteries, 3 is shown, together with further sources 53, having motor controlled switches 58 to connect to a bus and through an AC/DC converter 61 to the LVDC grid 51 in each zone and loads 56 taking power from the DC bus via a DC/AC converter 57.

Figure 8:
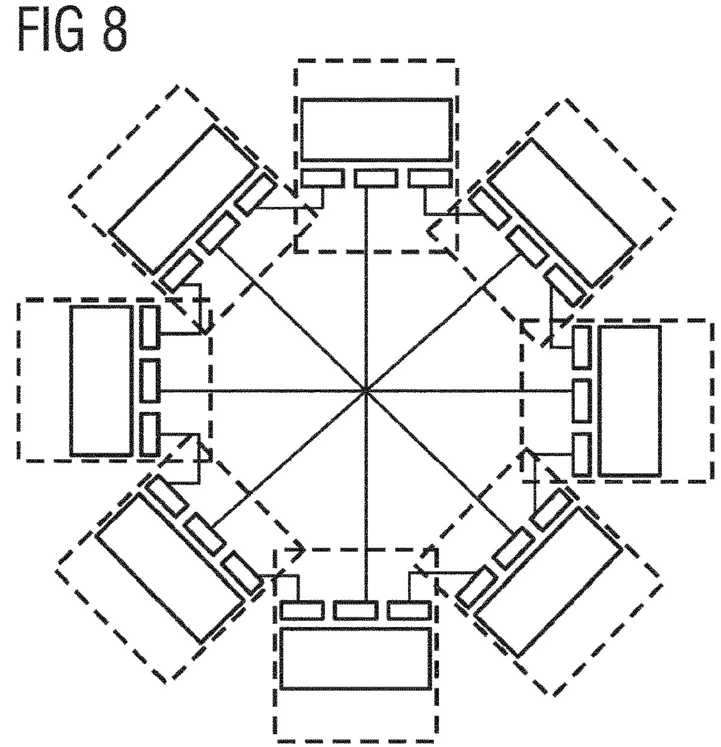
FIG. 8 shows another configuration.

FIG. 8 shows a configuration with the principal connections of the zones shown using 16 SSCBs. This uses a star configuration with an underlay ring configuration, which provides a full setup with the highest availability and best efficiency, as well as with fewer generators in operation. This has an optimized efficiency when partially loaded and only one generator is connected. The configuration is an optimized solution for very high availability requirements, complying with regulatory requirements which permit the loss of only one thruster or one generator when in operation.

Figure 9:
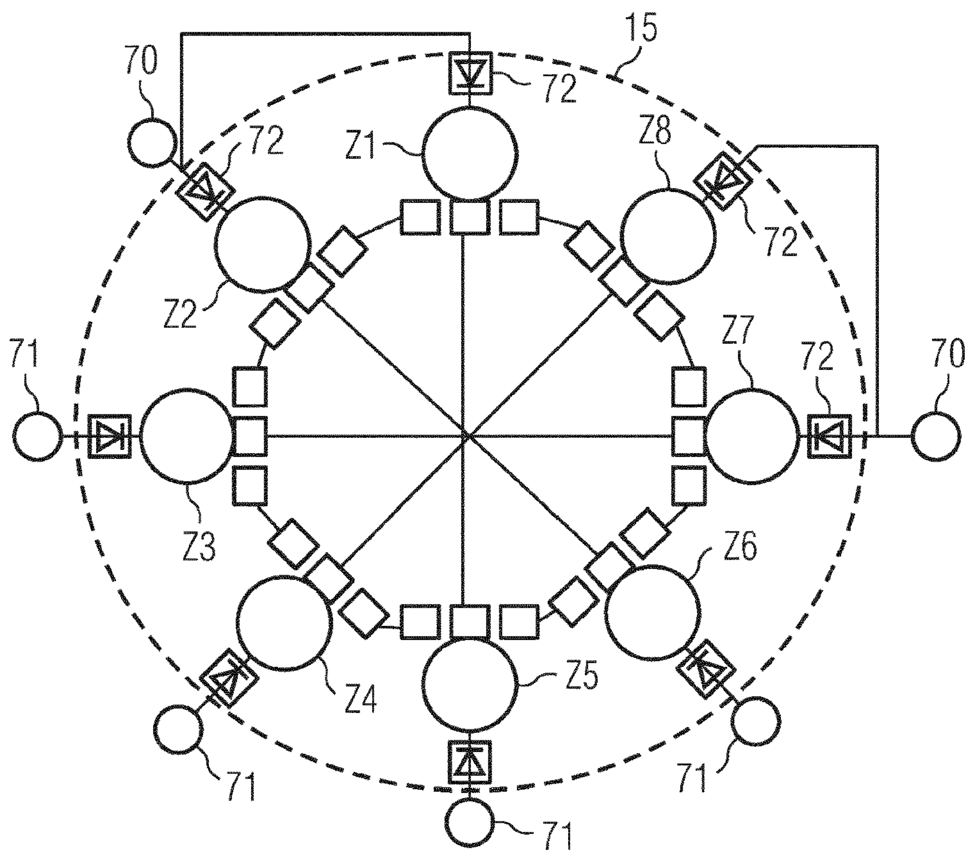
FIG. 9 shows an embodiment of a configuration with focus on drilling rig installation and optimized location.

FIG. 9 shows the configuration of FIG. 8 focused on drilling rig installation and optimized location with principal connection of the zones using 16 SSCBs. This has an optimized efficiency when partially loaded and only one generator is connected. This is sufficient for the regulatory requirements of standard availability. Within this principal setup it can also be seen that the efficiency operation of the engine or generator can be optimized by reducing the number of engines, for example by having two larger engines 70, which have a rating applicable for two zones and some smaller engines 71 for the other zones. In the example shown, there are nine load zones and six engine-generator zones topside. However, the larger generator 70 supplying two zones is connected to two rectifiers 72, one rectifier for each zone. This embodiment also shows the optimized location of the MVDC grids within the pillows of the pontoon below the waterline 15, whilst only the generators 70, 71 need to be located topside, together with the LVDC grid. Another option is to place the rectifier close to the generator. In this case, the connection from the individual MV Rectifier of each generator to the MVDC grid below the waterline is with a MVDC cable or busbar.

Figure 10:
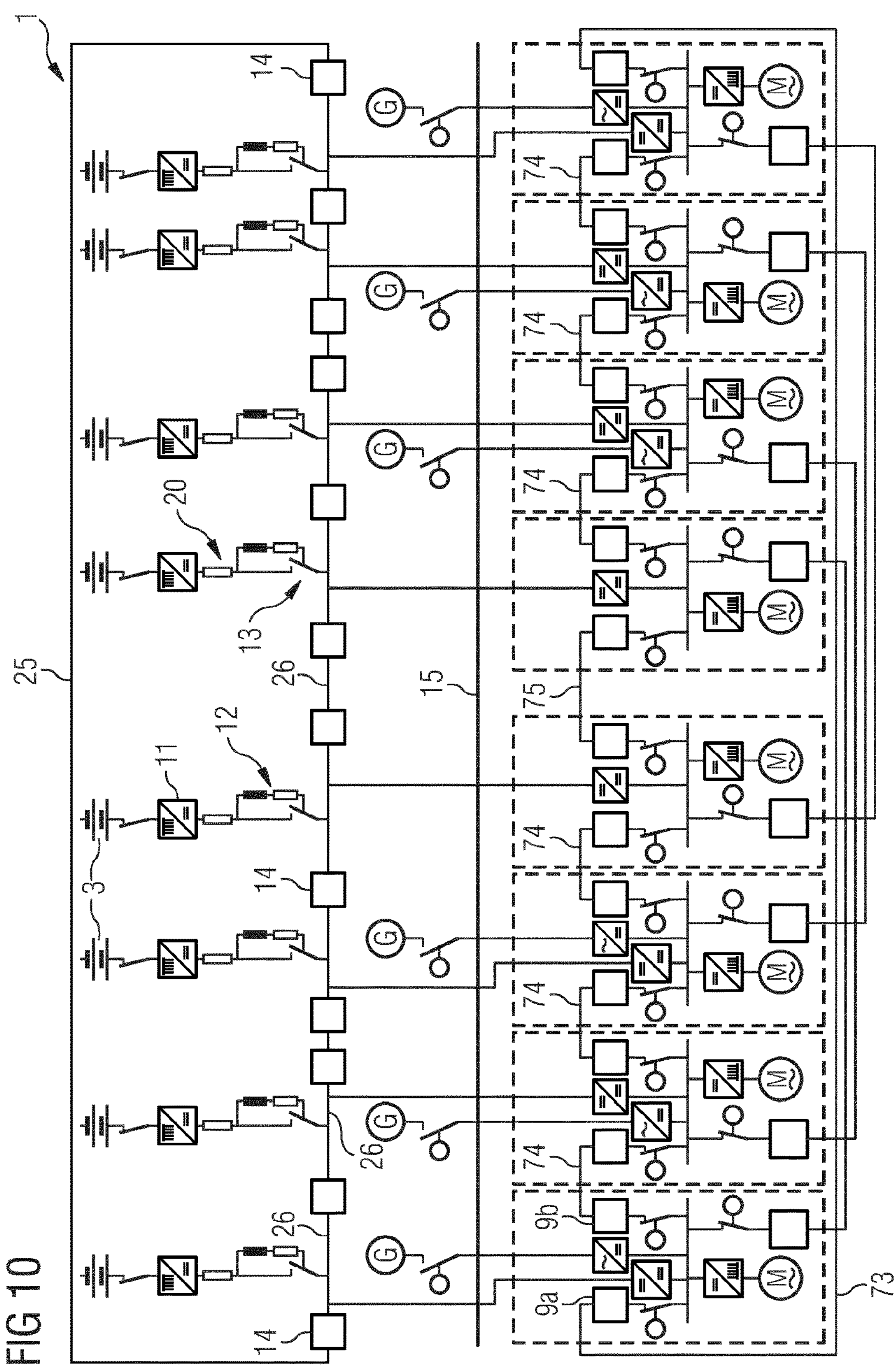
FIG. 10 shows a configuration for a drilling rig with the advantage of installation within the pillows of the pontoon.

FIG. 10 shows more detail of the configuration of FIGS. 8 and 9 for a drilling rig with the advantage of installation within the pillows of the pontoon, using 16 SSCBs. The arrangement uses this configuration on the MVDC for increased availability. The main equipment, the individual MVDC grids within each zone, are placed under the waterline within the pontoons. The LVDC grid takes the same form as previously described, e.g., in FIG. 1, so is not described in detail here again. The LVDC grid is connected via a DC/DC converter with the MVDC grid. On the LVDC grid only the batteries are shown, but typically, there are further sources and loads. The MVDC grids within each zone are connected together in series to form a ring by buses 73, 75 and bus ducts 74 and fast breakers 9*a*, 9*b* in each zone. In addition, fast breakers 9*c* connect pairs of grids together, i.e., Z1 and Z5, Z2 and Z6, Z3 and Z7 and Z4 and Z8.

Figure 11A:
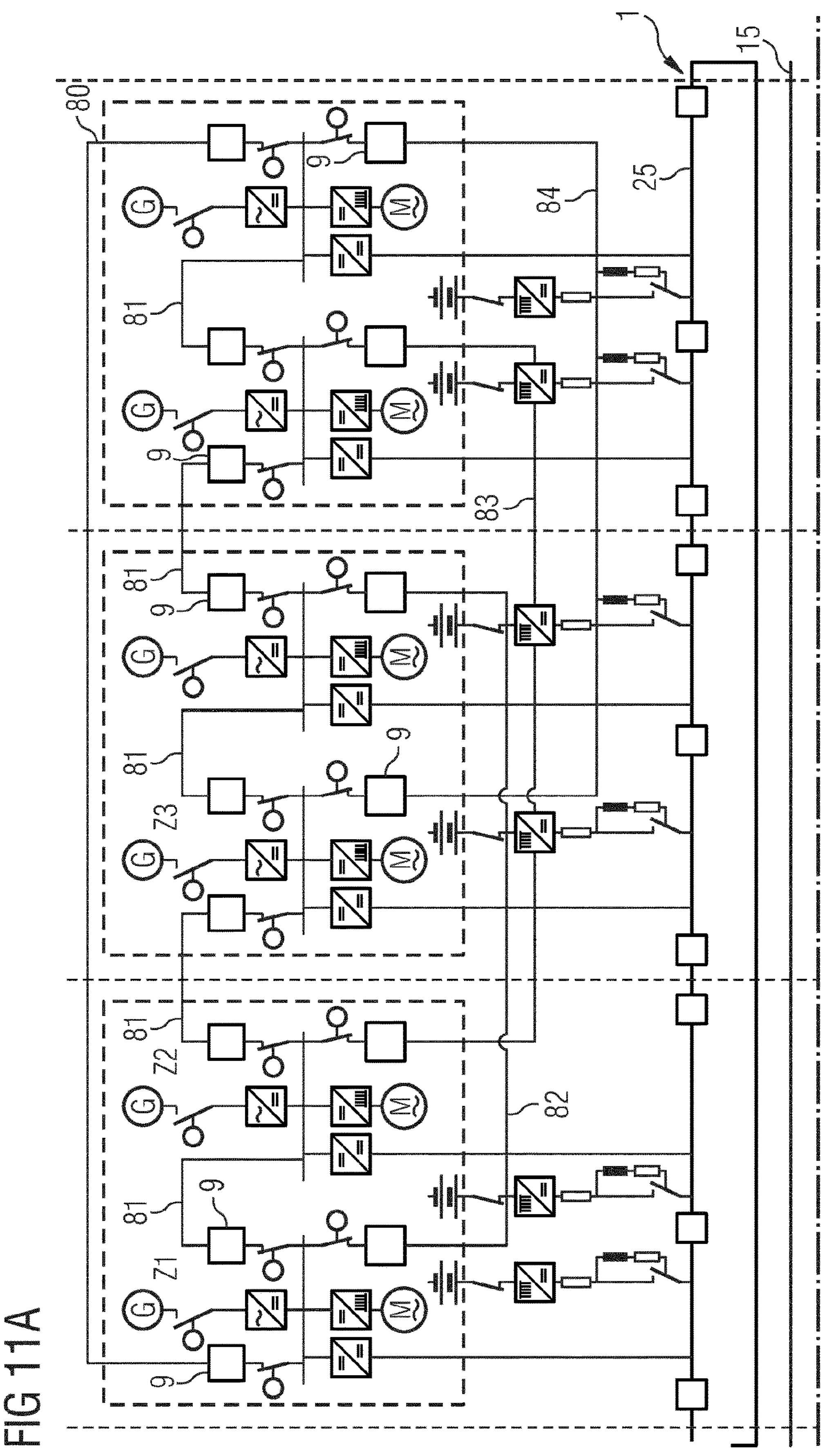
FIG. 11 shows an embodiment of a configuration for vessels or rigs for MVDC or LVDC.
Figure 11B:
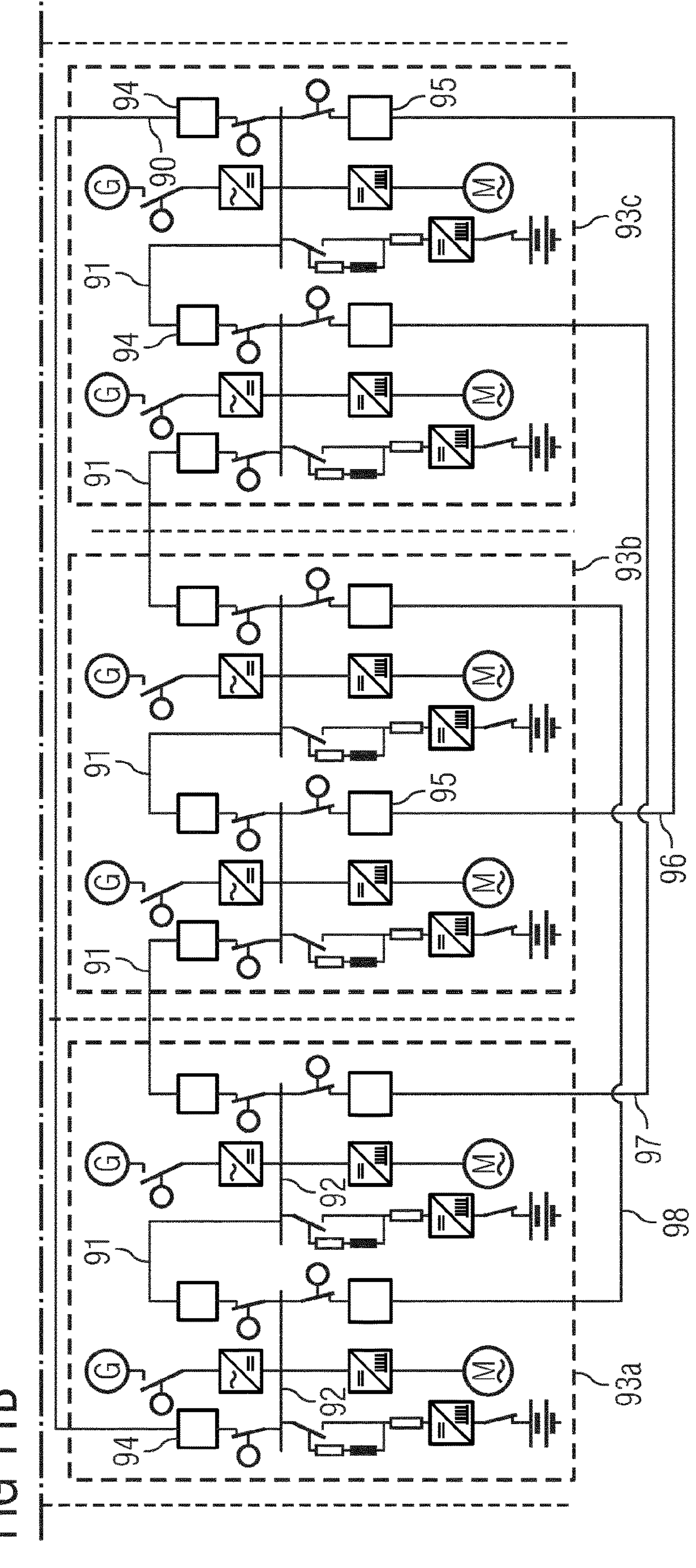

FIG. 11 shows another example of the configuration of FIGS. 8 to 10 for vessels or rigs for MVDC or LVDC having 16 SSCBs. The general arrangement is for 3 zones by using this configuration on the MVDC and on LVDC. For the MVDC solution there is a LVDC grid connected via a DC/DC converter with the MVDC grid. On the LVDC grid only the batteries are shown, but there may be further sources and loads. A ring is formed by buses 80, 81 in the MVDC part. Within a section containing two zones, e.g., Z1, Z2 the buses 81 connect via a single fast breaker 9, but connection of two zones across sections, e.g., Z2 and Z3, then a fast breaker 9 is provided at each end of the bus or bus duct 81. Additional connections between zones, across sections, are provided by buses 82, 83, 84, with fast breakers 9 at each end. The connected LVDC grid 1 is as previously described, with 6 energy storage units coupled to the LVDC ring. The LVDC configuration illustrated is also set up with a ring with connecting buses 90, 91 and the grid buses 92 in series. As with the MVDC example, connections across sections 93*a*, 93*b*, 93*c* use two fast breakers 94, one at each end of each bus, whereas connections within zones use only one fast breaker, at one end. Additional non-series connections to form a star, use fast breakers 95 at both ends of the buses 96, 97, 98.

Figure 12:
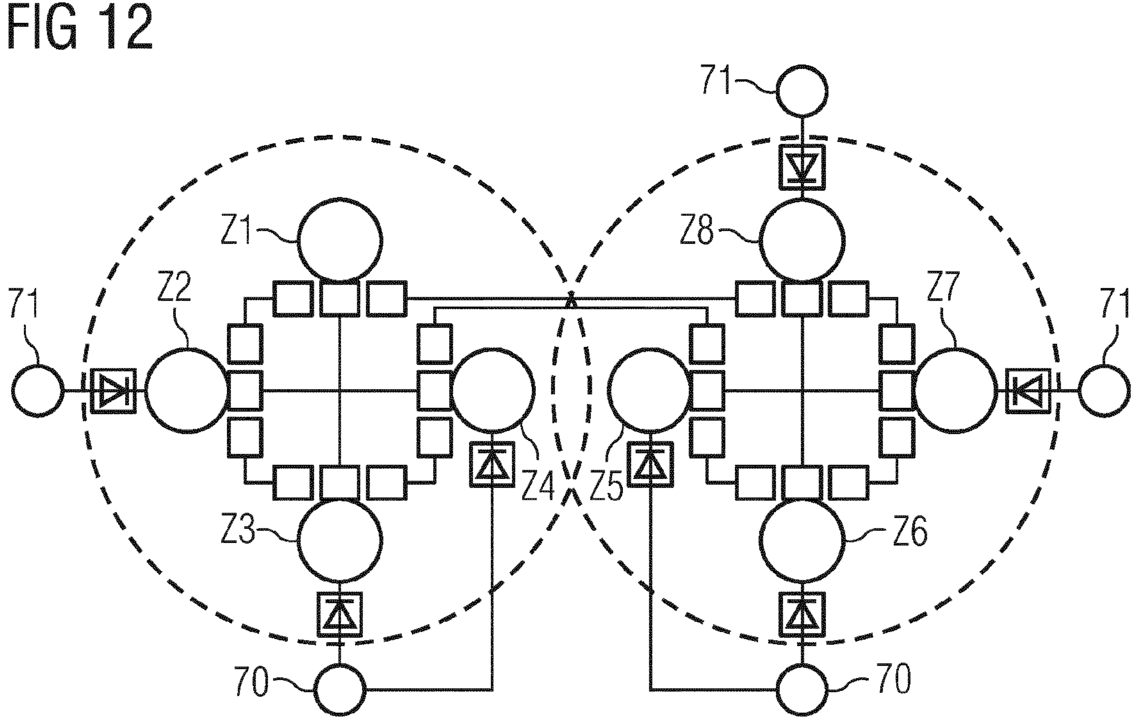
FIG. 12 shows an embodiment of a configuration optimised for a drilling rig where the MVDC grid is mounted within the pillows of the Pontoon; and, FIG. 13 shows another embodiment of a configuration optimized for a drilling rig where the MVDC grid is mounted within the pillows of the Pontoon.

FIG. 12 shows the type of configuration used in FIG. 8 to 11, in this case, optimized for a drilling rig where the MVDC grid is mounted within the pillows of the Pontoon, with 16 SSCBs. The connection of the zones is illustrated when an optimized configuration connection of this type is used. The optimized configuration has two such configurations (one within each pontoon side), while the underlaying ring connects the two such configurations. This will have an optimized efficiency when in partial load and with only one generator is connected. This is an optimized solution for very high availability requirements, where the loss of only one thruster or one generator is permitted. Large generators 70 may be shared, small generators 71 may connect directly to a single zone.

Figure 13:
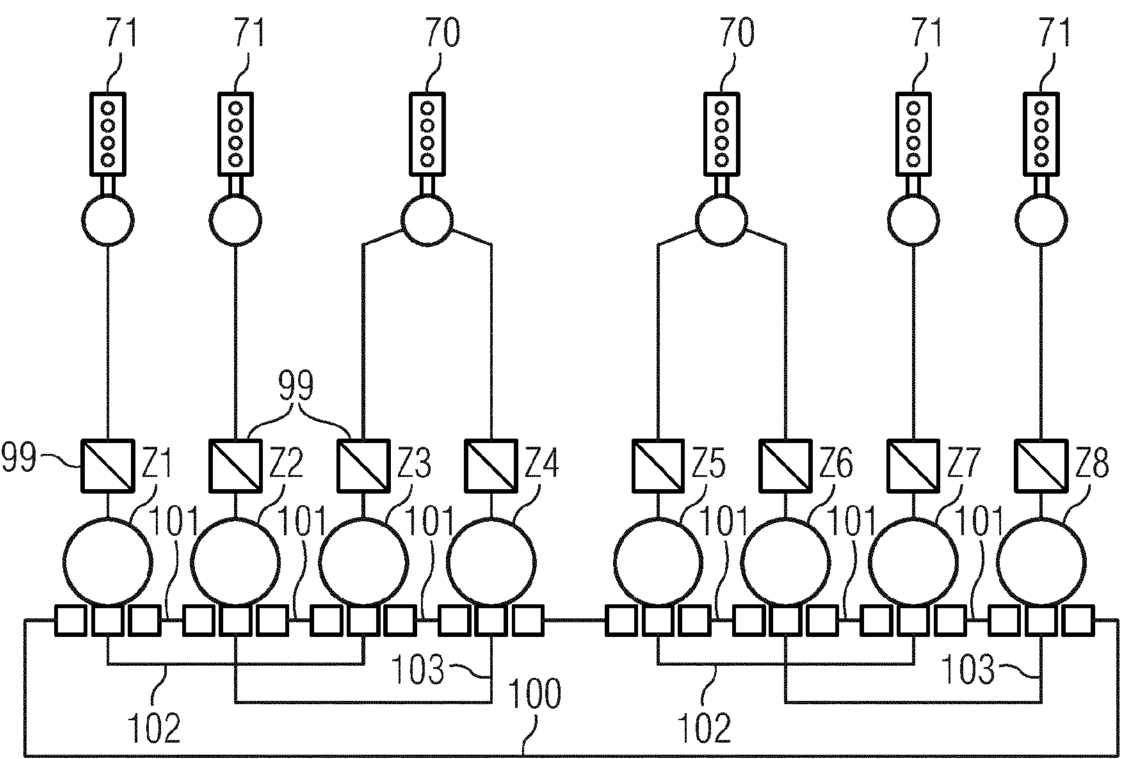

FIG. 13 shows a configuration as used in the examples of FIGS. 8 to 12, optimized for a drilling rig where the MVDC grid is mounted within the pillows of the pontoon and uses 16 fast breakers, or SSCBs. The arrangement shown uses the optimized configuration on the MVDC for increased availability as described above. The main equipment, the individual MVDC grids within each zone, are placed under the waterline within the pontoons. There is an LVDC grid as well. The LVDC grid is connected via a DC/DC converter with the MVDC grid. On the LVDC grid only the batteries are shown. There will be further sources and loads. Buses 100, 101 connect the adjacent zone grids in series in a ring. Buses 102, 103 provide star connections between non-adjacent zones. Power from the large generators 70 is shared, or from small generators 71 is directed to a single zone grid through AC/DC converters 99.

By altering the design as described and shown in the accompanying figures, each complete DC grid within one zone can be installed within the pillow of each pontoon, giving an energy optimized connection with the ECO STAR connection and giving higher availability with the SAFE STAR connection. For optimization there may be two SAFE STAR configurations, one for each side of the rig, or platform and an underlying ring connects the two SAFE STAR configurations with two DC cable or busbar connection between the sides.

The invention results in fewer losses there are fewer ILCs through which the energy has to be conducted and circular currents are avoided by using a star instead of a closed ring. For rigs or platforms, only the engines or generators and the DC multidrive drilling grid, together with any auxiliary supplies need to be installed topside, releasing space topside for other operational equipment.

The invention claimed is:

1. A power generation grid for a vessel, rig, or platform, the grid comprising:

a primary energy source located above a waterline, a plurality of DC sub-assemblies, located below the waterline;

wherein each DC sub-assembly comprises a DC bus, a DC/DC converter adapted to couple the DC bus to a DC energy source; an AC/DC converter adapted to couple the DC bus to an AC energy source; a DC/AC converter adapted to couple the DC bus to a corresponding load, and a first switch adapted to couple the DC bus to a DC bus of another DC sub-assembly;

wherein each DC sub-assembly further comprises a second switch adapted to couple the DC bus to a DC bus of one other of the plurality of DC sub-assemblies; and wherein each DC sub-assembly further comprises a third switch, adapted to be coupled to a DC bus of another of the plurality of DC sub-assemblies.

2. The grid according to claim 1, wherein each DC sub-assembly is adapted to be installed in a watertight housing below the waterline of a rig or platform having topside elements and elements below the waterline.

3. The grid according to claim 1, wherein a plurality of DC sub-assemblies are mounted in the same watertight housing.

4. The grid according to claim 1, wherein at least one of the DC sub-assemblies further comprises an AC/DC converter adapted to couple an AC generator to the DC bus.

5. The grid according to claim 1, wherein the primary energy source comprises a plurality of AC generators, or a plurality of DC generators, or a combination thereof.

6. The grid according to claim 1, wherein the DC energy source is disposed above the waterline and comprises a plurality of DC energy storage units.

7. The grid according to claim 6, wherein each DC energy storage unit comprises a plurality of energy storage modules each connected to a different DC bus.

8. The grid according to claim 6, wherein each DC energy storage unit is coupled via a bus section of a DC ring to the DC bus of the DC sub-assembly; and wherein the bus section of the DC ring is coupled at each end, via switches in the DC ring, to another bus section of the DC ring.

9. The grid according to claim 8, wherein each DC energy storage unit comprises a plurality of energy storage modules, each DC energy storage unit being coupled to a different section of the DC ring.

10. The grid according to claim 9, wherein the sections of the DC ring are separated by switches.

11. The grid according to claim 9, wherein the number of sections is greater than the number of energy storage modules connected to a section.

12. The grid according to claim 1, wherein the switches comprise solid state breakers, or comprise one of a semiconductor switch, or intelligent load controller.

13. The grid according to claim 5, wherein the AC generators are coupled to at least one DC sub-assembly; or wherein at least one of the AC generators is coupled to at least two DC sub-assemblies.

14. The grid according to claim 5, comprising: wherein the AC generator comprises a two-winding system with two rectifiers, one rectifier for each DC sub-assembly.

15. The grid according to claim 14, wherein the two rectifiers are connected in parallel to an output of the AC generator.

16. The grid according to claim 5, wherein the AC generator comprises a variable frequency generator.

17. The grid according to claim 1, wherein the grid operates at up to 1500 V DC.

18. The grid according to claim 1, wherein the grid operates at up to 35000 V DC.

19. The grid according to claim 17, wherein the grid operates between 1000V to 1500V DC.

20. The grid according to claim 18, wherein the grid operates between 6000V DC and 18000V DC.

21. The grid according to claim 18, wherein the grid operates between 6000V DC and 35000V DC.

22. The grid according to claim 1, wherein for each DC sub-assembly the first switch, the second switch, and the third switch directly connect the DC sub-assembly to respective different DC sub-assemblies of the plurality of DC sub-assemblies.

23. The grid according to claim 22, wherein each DC sub-assembly is disposed within a respective pontoon of a rig or platform.

* * * * *